UNITED STATES PATENT OFFICE.

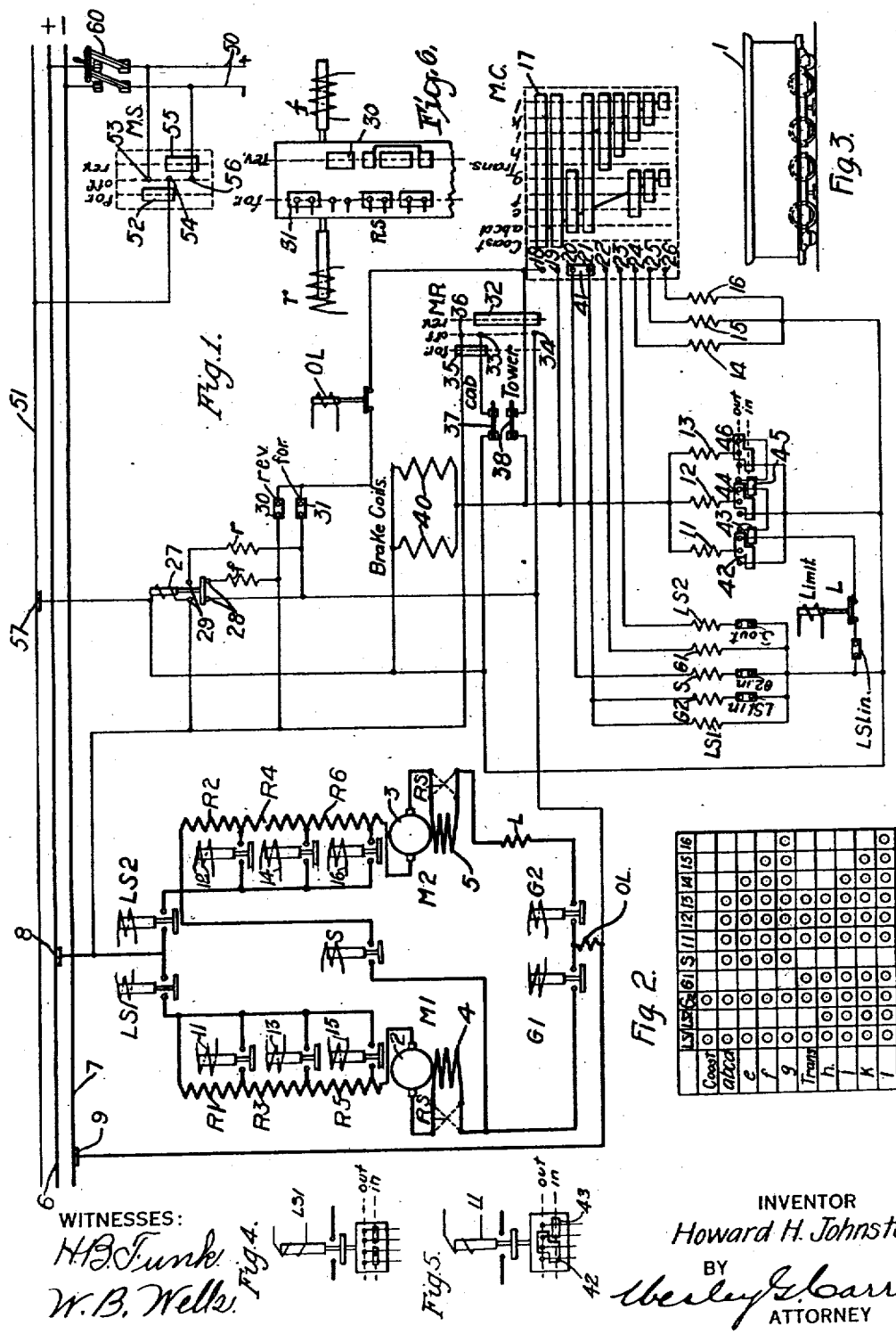

HOWARD H. JOHNSTON, OF EDGEWOOD PARK, PENNSYLVANIA, ASSIGNOR TO WESTINGHOUSE ELECTRIC & MANUFACTURING COMPANY, A CORPORATION OF PENNSYLVANIA.

SYSTEM OF CONTROL.

1,416,033.

Specification of Letters Patent. Patented May 16, 1922.

Application filed July 22, 1918. Serial No. 245,971.

*To all whom it may concern:*

Be it known that I, HOWARD H. JOHNSTON, a citizen of the United States, and a resident of Edgewood Park, in the county of Allegheny and State of Pennsylvania, have invented a new and useful Improvement in Systems of Control, of which the following is a specification.

My invention relates to systems of control and particularly to systems of control for electric vehicles.

The principal object of my invention is to provide a simple and economical system of control for governing the operation of an electric vehicle either from a cab mounted thereon or from a remote point.

Another object of my invention is to provide a system of control of the above-indicated type that shall be provided with control apparatus mounted on the electric vehicle for controlling its operation in a forward and in a reverse direction and with auxiliary control apparatus comprising a single control conductor for effecting control of the vehicle from a remote point.

A further object of my invention is to provide a system of control of the above-indicated character that shall have a relay mounted on the electric vehicle, means mounted on the vehicle and interlocked with the relay for governing the operation of the vehicle in a forward and in a reverse direction, and a single control conductor associated with the relay for effecting operation of the vehicle in a forward and in a reverse direction from a remote point.

In many industries using electric locomotives as, for example, the coke industry, it is often desirable not only to operate locomotives from the cabs mounted on them but also to operate the locomotives from remote points. Thus, in charging coal into and drawing coke from coke ovens, it is very desirable that the locomotives and the cars attached thereto be controlled from a tower located some distance from the heat of the ovens. However, as the locomotives are not always operated in proximity to the hot ovens, it is also desirable to provide the locomotives with means for controlling their operation from the cabs mounted on them.

In the accompanying drawing, Fig. 1 is a diagrammatic view of a control system constructed in accordance with my invention; Fig. 2 is a chart illustrating the sequence of operation of the switches shown in Fig. 1; Fig. 3 is a partial view of a locomotive; Figs. 4 and 5 are detail diagrammatic views of certain switches that are employed in my invention, and Fig. 6 is a diagrammatic view of a reversing device of familiar form that is employed in connection with my invention.

Referring to the drawing, a locomotive 1 is provided with two propelling motors M1 and M2, respectively, having armatures 2 and 3 and field windings 4 and 5 that are adapted to be connected to two power rails 6 and 7 by means of current collectors 8 and 9. A plurality of switches LS1, LS2, S, G1 and G2 are provided for governing the circuit connections of the motors M1 and M2 and a plurality of switches 11 to 16, inclusive, are provided for excluding resistors R1 to R6, inclusive, from the circuit of the motors during acceleration. The motors are also provided with customary reversing switches RS, a limit switch L and an overload switch OL.

A master controller MC for governing the operation of the locomotive from the cab thereof is provided with a movable contact segment 17 which is adapted to engage contact fingers 18 to 26, inclusive, when the controller is moved through positions *a* to *l*, inclusive. A relay 27, which is interlocked with a master reverser MR, is adapted to bridge contact fingers 28 when in a released position and to bridge contact fingers 29 when in an energized position. The relay 27 controls the energization of the coils *f* and *r* which effect the operation of the reversing switch RS. The reversing switch is provided with two interlock switches 30 and 31, which are respectively operative when the reversing switch is in a reverse and in a forward position, for connecting the master controller to one of the power rails 6 and 7. The master reverser MR embodies a contact segment 32 which is adapted to bridge contact fingers 33 and 34 when the master reverser is moved to the reverse position, and a contact segment 35 which is adapted to bridge contact fingers 33 and 36 when the reverser is in the forward position. The locomotive is also provided with a switch 37 which is closed when operation is effected from the cab and a switch 38 which is closed when the locomotive is operated from a remote point.

Brake coils 40, that may be operated either from the cab or from a remote point, are provided for effecting a release of the vehicle brakes. The line switch LS1 is provided, in a well known manner, with two interlock switches LS1-in, as indicated in Fig. 4, which are respectively inserted in the circuit of the coils of the switches G2 and 11. The switch G2 is provided with an interlock switch G2-in which is inserted in circuit with the coil of the switch S, and the switch S is provided with an interlock switch which is inserted in the circuit of the coil for the line switch LS2. An interlock switch 41, which is mounted on the master controller MC, is provided for bridging the contact fingers 20 and 21 in the "off" position of the controller in order to permit operation of certain of the switches from a remote point. The switches 11, 12 and 13 are provided with interlock switches 42 to 46, inclusive, as indicated in Fig. 5 for automatically excluding resistors R1 to R3, inclusive, from the circuit of the motors in a customary and well-known manner. The interlock switches LS1-in, G2-in and, S-out, are designated in a manner to indicate the position of the associated switch when the interlock switch is in a closed position.

A master switch MS, which is located at a remote point, is provided for selectively impressing positive or negative current from a supply circuit 50 upon a control conductor 51. The master switch MS embodies a contact segment 52 which is adapted to bridge contact fingers 53 and 54 for impressing positive current upon the control conductor 51 when the master switch is moved to the forward position and a contact segment 55 which is adapted to bridge contact fingers 54 and 56 for impressing negative current upon the control conductor 51 when the master switch is moved to the reverse position. The master switch MS, in a manner hereinafter set forth, effects the operation of the lococotive 1 in a forward direction when moved to the forward position and effects operation of the locomotive in a reverse direction when moved to the reverse position. The control apparatus on the locomotive 1 is connected to the control conductor 51 by means of a current collector 57.

When it is desired to operate the locomitive locally from the cab, the switch 37 is closed, the master reverser MR is positioned according to the direction of movement of the locomotive that is desired, and the acceleration of the motors is controlled by means of the master controller MC. In case it is desired to control the locomotive from a remote point, either in a forward or in a reverse direction, the switch 37 is opened, the switch 38 is closed and the master switch MS, which is located at any remote point, is moved to its forward or to its reverse position according to the direction of movement of the locomotive that is desired. In either the remote control or the local control of the locomotive, the relay 27 remains in its lower de-energized position during forward operation and, during reverse operation, the relay is energized to bridge the contact members 29.

Assuming the switch 37 to be closed and the master reverser MR to be moved to its forward position, the operation of the system by means of the master controller MC is as follows.

When the master controller is moved from the "off" position to the coasting position, a circuit is completed from the positive power rail 6 through the current collector 8, contact fingers 33 and 36 of the master reverser, which are bridged by contact segment 35, switch 37, brake coils 40. contact fingers 18 and 19 of the master controller, which are bridged by the contact segment 17, overload trip switch, interlock switch 31 of the reversing switch, which is closed when the master reverser is in a forward position, and the current collector 9 to the negative power rail 7. The brakes of the locomotive are now released to permit the acceleration of the locomotive in a forward direction.

In positions $a$, $b$, $c$ and $d$ of the master controller, the contact fingers 20 and 21 of the master controller are bridged by the contact segment 17 in order to complete circuits through the energizing coils of the switches S, LS1. G2, 11, 12 and 13. The circuit completed through the coil of the switch LS1 may be traced from the positive supply rail 6, through the current collector 8, contact fingers 33 and 36, which are bridged by the contact segment 35, switch 37, coil of the switch LS1, contact fingers 21 and 18, which are bridged by the contact segment 17 of the master controller MC, overload switch OL, interlock switch 31 of the reversing switch and the current collector 9 to the negative power rail 7. The switch LS1 is operated and the two interlock switches LS1-in complete circuits through the coil of the switch G2 and the coil of the switch 11. The circuit through the coil of the switch 11 may be traced from the positive supply rail 6 through the current collector 8, contact fingers 36 and 33, which are bridged by the contact segment 35, switch 37, interlock switch LS1-in, limit switch L, interlock switch 42 in the open or "out" position of switch 11, coil of the switch 11, contact fingers 21 and 18, which are bridged by the contact segment 17, overload switch OL, interlock switch 31, and the current collector 9 to the negative supply rail 7. The coil of the switch G2 is connected in parallel to the coil of the switch LS1 in the circuit above traced for the coil of line switch LS1. When the switch G2 is closed, the interlock switch G2-in completes a circuit through the energizing coil of the switch S.

The operation of the switches LS1, G2 and S completes a circuit through the propelling motors which is traced from the positive supply rail 6 through current collector 8, line switch LS1, resistors R1, R3 and R5, motor M1, switch S, resistors R2, R4 and R6, motor M2, coil of the limit switch L, switch G2, coil of the overload switch and the current collector 9 to the negative supply conductor 7. The motors M1 and M2 are operated in series-circuit relation, and the switches 11, 12 and 13 are successively operated by means of the limit switch L, in a well-known manner, to successively short circuit the resistors R1, R2 and R3 from the circuit of the motors. The energizing circuit for the coil of the switch 11 is completed through the interlock switch 42 and the limit switch L and, when the switch 11 is operated, a holding circuit therefor is established through the interlock switch 42 independent of the limit switch l. After the operation of the switch 11, an energizing circuit, under the control of the limit switch L, is established for the coil of the switch 12 through the interlock switches 44 and 43, which respectively correspond to the open and the closed positions of switches 12 and 11. The interlock switches 44 and 46, which are associated with the switches 12 and 13, successively serve to establish energizing and holding circuits for the switches 12 and 13.

When the master controller MC is successively moved through the positions e, f and g, the switches 14, 15 and 16 are successively operated for short-circuiting the resistors R4, R5 and R6 from the circuits of the motors.

Between positions g and h of the master controller, is a transition position during which the switch S is released and the switches G1 and LS2 are operated to connect the motors in parallel-circuit relation. The contact segment 17 of the master controller also disengages contact fingers 24, 25 and 26 to insert the resistors R4, R5 and R6 in the circuit of the motors. In positions i, k and l of the master controller, the resistors R4, R5 and R6 are successively excluded from the circuits of the motors.

In case it is desired to operative the locomotive in a reverse direction by means of the master controller MC, then the master reverser MR is moved to the reverse position and a circuit is completed through the energizing coil of the relay 27 which is traced from the positive supply rail 6 through the current collector 8, coil of the relay 27, switch 37, contact fingers 33 and 34, which are bridged by the contact segment 32 of the master reverser MR and the current collector 9 to the negative supply conductor 7.

When the relay 27 is operated, a circuit is completed from the positive supply rail 6 through the current collector 8, switch 27, reversing coil r of the reversing switch and the current collector 9 to the negative supply rail 7. The reversing switch RS is thus operated, and the locomotive is placed in condition for operation in a reverse direction.

The operation of the master controller through its successive positions is similar to that set forth in discussing the forward operation of the locomotive, and a detailed tracing of the circuits completed is deemed unnecessary.

Assuming the relay 27 to be in a released position, the master controller MC to be in the "off" position, the switch 37 to be open and the switch 38 to be closed, then the locomotive may be operated in a forward or in a reverse direction by means of the master switch MS, which is located at a point remote from the locomotive.

In case it is desired to operate the locomotive in a reverse direction, the master switch MS is moved to the reverse position and a circuit is completed from the negative conductor of the supply circuit 50 through the contact fingers 54 and 56, which are bridged by the contact segment 55, control conductor 51, current collector 57, coil of the relay 27 and current collector 8 to the positive supply rail 6 which is connected to the supply circuit 50 by means of a switch 60. Thus, the relay 27 is operated to complete a circuit from the positive supply rail 6 through the current collector 8, relay 27, reversing coil r, and the current collector 9 to the negative supply rail 7 in order to prepare the locomotive for operation in a reverse direction.

When the relay 27 is operated, circuits are also completed through the brake-release coils 40 and coils of the switches LS1, G2, S, 11, 12 and 13. The circuit through the brake release coils 40 is traced from the control conductor 51 which is energized by negative current through the current collector 57, coils 40, switch 38, overload switch OL, interlock switch 30, which has been operated by the reversing coil r, and the current collector 8 to the positive supply rail 6. The circuit for the coil of the line switch LS1 is traced from the control conductor 51 through the current collector 57, coil of the line switch LS1, switch 38, overload switch OL, interlock switch 30 and the current collector 8 to the positive supply rail 6. The switches G2 and S are successively operated by means of the interlock switches LS1-in and G2-in to connect the motors in series-circuit relation, and the switches 11, 12 and 13 are successively and automatically operated to short circuit the resistors R1, R2 and R3.

When the locomotive is operated by the switch MS, a very limited speed of the locomotive is desired and, accordingly, the resistors R4, R5 and R6 are maintained in the motor circuit and no parallel connection of the motors is effected.

In case it is desired to operate the locomotive in a forward direction by means of the master switch MS, the master switch is moved to its forward position, and positive current is supplied to the control conductor 51 from the supply circuit 50, through the contact fingers 53 and 54, which are bridged by the contact segment 52. When the control conductor 51 is supplied with positive current, the relay 27 is released, inasmuch as both terminals of the energizing coil thereof are connected to positive sources of current. Upon the release of the relay 27, a circuit is completed from the positive supply rail 6, through current collector 8, coil f for the reversing switch, relay 27, which bridges the contact fingers 28, and the current collector 9 to the negative supply rail 7.

After the reversing switch RS has been moved to its forward position, the switches LS1, G2, S, 11, 12 and 13 and the brake coils 40 are operated, in a manner similar to that set forth in discussing the reverse operation of the locomotive, by means of the master switch MS, and a detailed discussion thereof is considered to be unnecessary.

Modifications in the system, arrangement and location of parts may be made within the spirit and scope of my invention, and such modifications are intended to be covered by the appended claims.

I claim as my invention:

1. In a system of vehicle control, the combination with a motor mounted on said vehicle, of means for operating said motor in a forward or a reverse direction from a point on the vehicle, means comprising a single conductor for operating said motor from a point external to the vehicle, and switching means for permitting the one or the other type of operation in accordance with the position of said switching means.

2. In a system of vehicle control, the combination with a driving motor for the vehicle, of a relay, means interlocked with said relay for governing the operation of said motor in a forward or a reverse direction from a point on the vehicle, means comprising a single auxiliary-control-circuit conductor for controlling the relay to effect forward or reverse operation of said motor from a point external to the vehicle, and a plurality of switches for respectively permitting the one or the other type of operation in accordance with the closure of the corresponding switch.

3. In a system of vehicle control, the combination with a motor mounted on said vehicle, of means for operating said motor from a point on the vehicle, means for operating said motor from a point external to the vehicle, and independent switching means for permitting the one or the other type of operation in accordance with the position of said switching means.

4. In a system of vehicle control, the combination with a driving motor for the vehicle, of a relay, means interlocked with said relay for governing the operation of said motor from a point on the vehicle, means for controlling the relay to effect operation of said motor from a point external to the vehicle, and a plurality of switches for respectively permitting the one or the other type of operation in accordance with the closure of the corresponding switch.

In testimony whereof, I have hereunto subscribed my name this 13th day of July, 1918.

HOWARD H. JOHNSTON.